(12) United States Patent
Bouvet et al.

(10) Patent No.: US 8,425,705 B2
(45) Date of Patent: Apr. 23, 2013

(54) METHOD OF MANUFACTURING A BLANK MADE FROM THERMOPLASTIC COMPOSITE MATERIAL, ASSOCIATED MANUFACTURING TOOL AND USE OF THE METHOD TO PRODUCE STRUCTURAL AIRCRAFT PARTS

(75) Inventors: David Bouvet, Missillac (FR); Didier Kurtz, Pornic (FR)

(73) Assignee: Airbus Operations, Toulouse (FR)

( * ) Notice: Subject to any disclaimer, the term of this patent is extended or adjusted under 35 U.S.C. 154(b) by 338 days.

(21) Appl. No.: 12/920,728

(22) PCT Filed: Mar. 24, 2009

(86) PCT No.: PCT/FR2009/050502
§ 371 (c)(1),
(2), (4) Date: Sep. 2, 2010

(87) PCT Pub. No.: WO2009/125122
PCT Pub. Date: Oct. 15, 2009

(65) Prior Publication Data
US 2011/0017386 A1    Jan. 27, 2011

(30) Foreign Application Priority Data
Mar. 27, 2008  (FR) ...................................... 08 51979

(51) Int. Cl.
*B32B 37/00* (2006.01)
(52) U.S. Cl.
USPC ........... 156/64; 156/228; 156/359; 156/583.1
(58) Field of Classification Search ..................... 156/64, 156/228, 285, 286, 358, 359, 580, 581, 583.1
See application file for complete search history.

(56) References Cited

U.S. PATENT DOCUMENTS

| | | | |
|---|---|---|---|
| 5,039,371 A | 8/1991 | Cremens et al. | |
| 5,108,532 A * | 4/1992 | Thein et al. | 156/285 |
| 5,344,602 A | 9/1994 | Yencho | |
| 2004/0032058 A1 | 2/2004 | Neeper et al. | |
| 2006/0144511 A1* | 7/2006 | Abergel | 156/277 |
| 2009/0321978 A1 | 12/2009 | Kurtz et al. | |

FOREIGN PATENT DOCUMENTS

| | | |
|---|---|---|
| GB | 2 332 872 | 7/1999 |
| JP | 02 162017 | 6/1990 |
| WO | 90 11185 | 10/1990 |

OTHER PUBLICATIONS

International Search Report issued Oct. 12, 2009 in PCT/FR09/050502 filed Mar. 24, 2009.
U.S. Appl. No. 13/203,350, filed Aug. 25, 2011, Kurtz, et al.

* cited by examiner

*Primary Examiner* — James Sells
(74) *Attorney, Agent, or Firm* — Oblon, Spivak, McClelland, Maier & Neustadt, L.L.P.

(57) ABSTRACT

A method of manufacturing a blank made from thermoplastic composite material, in which a pressure and temperature cycle is applied by pressing on top of a compacting plate that is itself on top of a stack of fibers including continuous fibers pre-impregnated with a thermoplastic resin, which stack has been previously placed on a board with the film enveloping the stack being brought into contact with fixing blocks arranged at the periphery of the board, and by heating the stack so as to reach at least the melting temperature of the resin while leaving the film infusible and smooth, and allowing the gas(es) present in the stack to escape through at least one opening left in the enveloping film and then through at least one emerging channel formed in the compacting plate and/or in the board and/or in the fixing blocks.

9 Claims, 5 Drawing Sheets

METHOD OF MANUFACTURING A BLANK MADE FROM THERMOPLASTIC COMPOSITE MATERIAL, ASSOCIATED MANUFACTURING TOOL AND USE OF THE METHOD TO PRODUCE STRUCTURAL AIRCRAFT PARTS

TECHNICAL FIELD AND PRIOR ART

The present invention relates in general to a method of manufacturing a panel or blank made from thermoplastic composite material, in particular made from thermoplastic composite material reinforced by continuous fibres. By way of example, these may be composites comprising a thermoplastic matrix based on PPS or PEI resin reinforced with carbon fibres or glass fibres, in the form of a fabric.

The invention relates preferably to a method of manufacturing panels or blanks having a thickness of between approximately 1 and 8 mm, such as those conventionally found in the aeronautics field and intended to be shaped, during a subsequent manufacturing step, by press forming, using methods of the punch/mould type as described in EP0584017 or stamping methods, which do not require any additional trimming operations.

Implementation of the invention therefore leads to the obtaining of a panel having flatness, surface finish, strength and contour characteristics which make it suitable for use as is or after a forming operation to produce parts which constitute structural aircraft elements.

The conventional methods of manufacturing a blank made from composite material generally consist in carrying out two successive steps, namely a drape forming step followed by a consolidation step, also known as the compacting step.

For aeronautical applications, the drape forming step consists in creating a stack of fibre fabrics pre-impregnated with resin, with the aim of obtaining a plurality of layers or plies superposed in a stacking direction.

The step of consolidating the stack consists for its part in compressing the stack using a compacting plate arranged above the stack. This compacting plate makes it possible, via the application of a pressure, to compact in the stacking direction the assembly consisting of the superposition of pre-impregnated fibre fabrics, and simultaneously to evacuate the air and the gases present in the stack so that the blank obtained has an acceptable degree of porosity (less than 5%). Moreover, this step of consolidating the stack is carried out by applying a heating to the latter in order to bring it to the temperature necessary to obtain the melting of the resin pre-impregnated onto the fibres, and therefore with the aim of obtaining a compact and integral final element.

Such a method is commonly carried out using an autoclave, which makes it possible simultaneously to apply the external pressure required for the compacting, the vacuum in the zone of the stack to facilitate the degassing thereof and, finally, to bring the assembly as a whole to the required temperature. Such a compacting carried out in an autoclave ensures:
  a uniform distribution of the compacting pressure,
  effective degassing (external pressure+vacuum).

The panels thus obtained are then cut into multiple blanks, for example by abrasive water jet cutting, the blanks then being shaped by forming methods such as stamping.

Autoclaves are specific and expensive means. Therefore, often just one is present in a workshop or manufacturing factory, which then gives rise to bottlenecks in the manufacturing flows. Furthermore, on account of their design (the application of external pressure to the stack by the gas pressure inside the autoclave, the need to heat a large volume of this gas in the chamber), the use thereof takes a relatively long time (hours).

The operation of cutting the panel produces waste which may account for almost 30% of the weight of the initial panel, which is economically disadvantageous, particularly for high-cost materials such as those used in aeronautics construction.

Thus, in the case of small parts having a surface area of less than 3 $m^2$, and in particular between 0.1 and 0.5 $m^2$, it may be advantageous to carry out this consolidation step using a press in order to reduce the cycle time. This additionally has the advantage, in the case of a factory or workshop using this type of material by forming, of using the same type of means (presses) as those used for the forming, thereby resulting in increased flexibility in terms of production management.

The difficulty of consolidation using a press lies in the possibility of obtaining flatness and surface finish characteristics of the panels as well as a strength (absence of pores or voids) which are acceptable for aeronautics-type applications.

There is known from document JP02162017A a compacting method which makes it possible to limit an excessive expulsion of resin from the stack during the pressing. To this end, the method uses the combined effects of the vacuum inside a compacting chamber delimited by a flexible bladder, the pressing of the stack by means of a pressing plate (flat block) and the limiting of the flows of resin by fixing blocks.

This type of method, combining the effects of the vacuum and of the pressing, makes it possible in a relatively easy manner to obtain an optimal degassing (due to the effect of the vacuum) before or at the same time as the compacting (pressing). The presence of fixing blocks makes it possible to limit the drying-out phenomena to edge effects. In other words, the pores which exist in the material are present only over a width of a few tens of mm (typically between 30 and 50 mm) distributed along the edge of the panels thus compacted. These porous zones are eliminated during subsequent trimming operations.

In the case of the method of compacting using a press, described above, and which applies preferably to the production of blanks having a small surface area, such a zone affected by drying out, located at the edge of the blank, is generally unacceptable since it gives rise to a significant additional cost with regard to the useful surface area of the part. The additional cost in question arises both from the cost of the material and from the cost of the necessary trimming prior to stamping. This is particularly appreciable for aeronautics-type applications using particularly expensive raw materials (impregnated fabrics).

Furthermore, the use of the "under a press" method makes it necessary to achieve high pressures in order to ensure effective expulsion of the air and gases contained in the stack, but without expelling the resin (drying out).

The patent WO 90/11185 discloses a method of manufacturing parts made from thermoplastic composite material starting from a stack of fabrics composed of continuous fibres which is pre-impregnated with a thermoplastic resin, in which the stack is sandwiched between two pressure plates which are themselves sandwiched between two layers of glass fibre cloth, the whole assembly being placed in a vacuum bag of the Kapton® type.

SUMMARY OF THE INVENTION

The aim of the invention is therefore to propose, with little cost and using customary means, a method of manufacturing blanks made from composite material composed of continuous fibres and thermoplastic resin, starting from a stack of fabrics pre-impregnated with thermoplastic resin.

To this end, the invention relates to a method of manufacturing a blank made from thermoplastic composite material for a subsequent forming operation, in which the following steps are carried out:

a) a stack of fabrics composed of continuous fibres which is pre-impregnated with a thermoplastic resin is enveloped with a smooth film, leaving at least one opening (O), b) fixing blocks are arranged at the periphery of a board and the stack of fabrics is placed onto the board so as to bring the film enveloping the stack into contact with the fixing blocks, c) a compacting plate is placed on top of the stack of fabrics enveloped by the film and placed onto the board, d) a pressure and temperature cycle is applied, by pressing on top of the compacting plate and by heating the stack so as to reach at least the melting temperature of the resin while leaving the film infusible and smooth, and allowing the gas (es) present in the stack to escape through the opening and then through at least one emerging channel formed in the compacting plate and/or in the board and/or in the fixing blocks.

There is thus obtained, with the aid of customary means, such as the forming presses used subsequently for the definitive forming of the blank into a part, a compacted blank having no pores filled with air and/or gas. In particular, no expensive operation of trimming the edges of the blank is required.

The method which forms the subject matter of the invention makes it possible to guarantee the geometric qualities of the blank. It is specified here and in the context of the invention that a blank is an intermediate or semi-finished product having defined geometric characteristics and intended to be shaped subsequently, typically by being stamped. This is achieved on the one hand by ensuring that the pre-impregnated stack of fabrics makes contact with the sizing elements (board, fixing blocks and compacting plate) throughout the manufacturing process, and on the other hand by ensuring that the contact with these various elements is always achieved through a smooth film, of glossy appearance, so as to satisfy the surface finish requirement throughout all the manufacturing phases. Thus, the variation in volume of the stack is very well controlled during the manufacture according to the invention.

In the context of the invention, this volume occupied by the stack may vary under the effect of the following three phenomena:

bulk, which means that the "dry" stack of pre-impregnated fabric occupies a thickness much greater than its final thickness, approximately twice the final compacted thickness, the melting of the resin, which is accompanied by an increase in volume of said resin, shrinkage during cooling.

Then, in the context of the invention, the aim is to ensure the absence of pores in the compacted material by:

ejection of the air and/or gas(es) contained in the stack, no expulsion of resin (drying out) during the compacting phase when the resin is molten.

The invention makes it possible:

to ensure the passage of gases from the stack to outside the tool (to evacuate said gases), to contain the resin within the stack in a leaktight manner, to maintain the contact with the sizing elements, i.e. the board, the fixing blocks and the compacting plate, throughout the entire compacting cycle in order to ensure the geometric quality of the blank.

In order to carry out the invention, use may advantageously be made of a tool which consists for the movable part of a compacting plate, preferably of thick cross-section and not being very deformable, thus allowing a uniform distribution of the pressure supplied by the press into which the tool is inserted over the surface of the stack to be compacted.

Use may also be made of a flat board or a board having plateaux of variable height in the case of producing a blank of progressive thickness.

Fixing blocks may be fixed to the perimeters of this board and may optionally be provided with grooves so as to allow the drainage and evacuation of the air and/or gas(es) contained inside the stack during the pressing. These fixing blocks make it possible both to calibrate the thickness of the panel produced by the method and, furthermore, in combination with the effect of the film according to the invention, to suppress the lateral creep of the resin during the compacting operation. When the stack is placed onto the board, the film enveloping the stack comes into contact with all the fixing blocks.

The manufacturing tool, intended for carrying out the method according to the invention, may advantageously be inserted into a single-action or double-action hydraulic press, capable of supplying a closing force corresponding to a pressure of at least 1 MPa distributed over the entire stack to be treated.

The press is preferably equipped with heating plates, heated for example by boiling oil and/or by electrical resistors and/or by induction or any other means suitable for transmitting their temperature to the tool, which is itself placed on these heating plates. In an alternative solution, without departing from the scope of the invention, the tool may be heated directly by the same means as those mentioned for the heating plates.

Since the film used according to the invention is preferably placed onto the board, the stack to be compacted is initially placed thereon. The edges of the film are then folded onto the stack and held in this position at the four corners, preferably by high-temperature adhesive, so as to form four elements forming darts.

At least one sheet of film is then slid under the darts so as to cover the upper surface of the stack.

This film forms an interface between the board, the compacting plate and the stack. It thus prevents any sticking of resin to these elements during compacting. Furthermore, since the film has a very smooth (glossy) surface, it makes it possible to improve considerably the surface finish of the blank, since the surface finish both of the compacting plate and of the board is in this case not "imprinted" onto the surface of the blank.

Thus, the glossy appearance of the films used according to the invention which are in contact with the surface of the stack during the consolidation step advantageously makes it possible to obtain an extremely satisfactory surface finish for the blank obtained, said surface finish being entirely compatible with the high surface quality requirements encountered in certain fields, such as the aeronautics field.

Furthermore, the film also advantageously allows an excellent drainage of the gases during the consolidation step.

This is explained by the possible evacuation of the air and/or gases initially located within the stack, through the overlap zone(s) forming an opening in the film enveloping the stack to be compacted. The degassing carried out therefore proves to be satisfactory, and makes it possible to obtain a blank having a low degree of porosity, thereby conferring thereon particularly impressive overall mechanical strength properties.

To this end, depending on the surface area of the stack, it may be advantageous to create other overlap zones by multiplying the overlapping sheets of film. Thus, the upper film may advantageously be separated into two or more parts or sheets having overlap zones, and the film placed in the lower zone may also consist of two or more parts or sheets. The multiplication of the overlap zones which constitute zones of reduced impermeability is particularly advantageous for carrying out the method which forms the subject matter of the invention, in particular for creating blanks having a large surface area.

The enveloping of the blank to be compacted by the film also makes it possible to retain all the resin inside the stack. This is because the overlap zones of the film, although allowing air and/or gases to escape from the stack during the pressing of the latter, do not allow the resin to "escape" since the latter has too high a viscosity to flow through the overlap openings, said openings moreover being closed by the pressure.

Thus, due to the use of the film enveloping the stack and of the fixing blocks, the ratio between the volume of fibres and the volume of resin in the stack is constant throughout the entire compacting process. The appearance of the drying-out phenomenon resulting from the expulsion of the resin from the stack during the process is thus avoided.

In one preferred embodiment of the invention, the smooth film used is a polyimide film.

According to one advantageous embodiment, step b) of the method is carried out by providing fixing blocks which are stationary relative to the board and by cutting the stack of fabrics to the dimensions corresponding to those between the fixing blocks.

The invention also relates to a tool intended for manufacturing a blank made from composite material composed of continuous fibres.

According to the invention, the tool comprises a board, a compacting plate, fixing blocks and at least one emerging channel formed in the board and/or in the compacting plate and/or in the fixing blocks.

Such a channel thus advantageously allows the passage of gases from the stack to outside the tool (in order to evacuate said gases).

The invention also relates to a hydraulic press (P), intended for manufacturing blanks made from composite material composed of continuous fibres, the press being equipped with heating plates suitable for melting the thermoplastic resin of the composite material, and comprising a tool as described above inserted between the plates.

One particularly advantageous use of the method according to the invention is that of manufacturing blanks made from composite material which are used as structural aircraft parts.

BRIEF DESCRIPTION OF THE DRAWINGS

Other advantages and features will become more clearly apparent from reading the detailed description given with reference to the figures, which respectively show.

DETAILED DESCRIPTION OF PARTICULAR EMBODIMENTS

Figure 1:
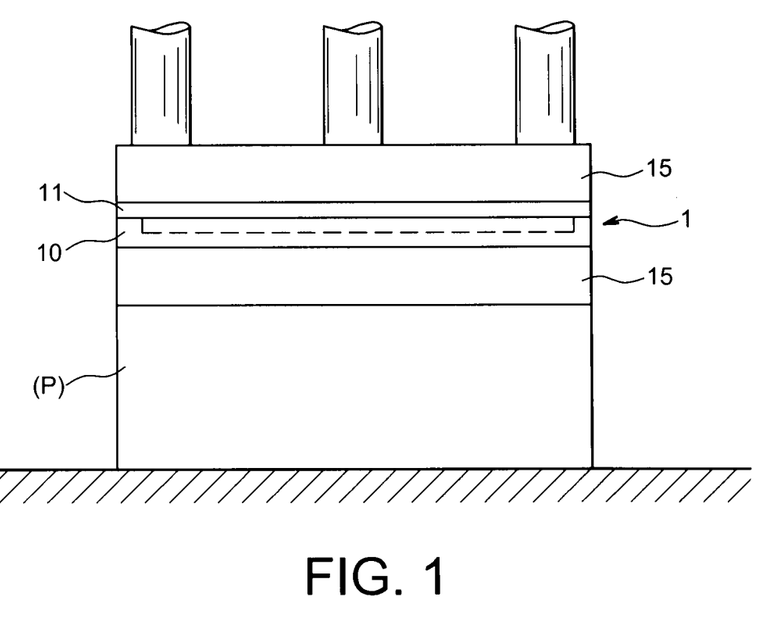
FIG. 1: a schematic view of a press according to the invention (P), intended for manufacturing blanks made from composite material composed of continuous fibres, in which a tool 1 is placed between upper and lower heating plates.

With reference to FIG. 1, a hydraulic press according to the invention (P) comprises firstly a compacting tool 1 consisting of two parts, a lower part 10 supporting a board 12 and fixing blocks 14 and an upper part 11 supporting a compacting plate 13.

The two parts 10, 11 can move in translation with respect to one another along the axis Z of FIG. 1 and are fixed in the other degrees of freedom by means which are conventionally used for tools operating under a press and known to the person skilled in the art.

Figure 2:
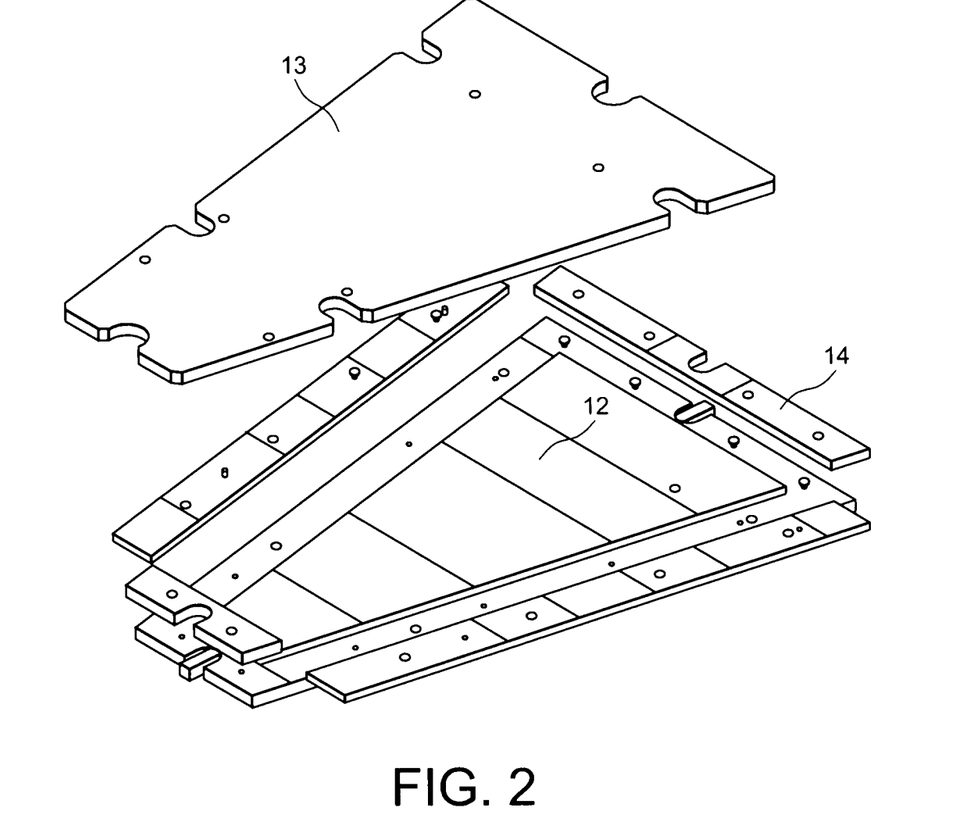
FIG. 2: a view of a tool 1 according to the invention for producing a non-rectangular blank which moreover has a progressive thickness, the areas A, B, C, D and E of the board 12 according to the invention being of different height.

With reference to FIG. 2, the fixing blocks 14 of suitable thickness are arranged and assembled in the lower part 11 of the tool by screwing (fixing holes 41) onto the perimeter of the board 12.

Figure 3:
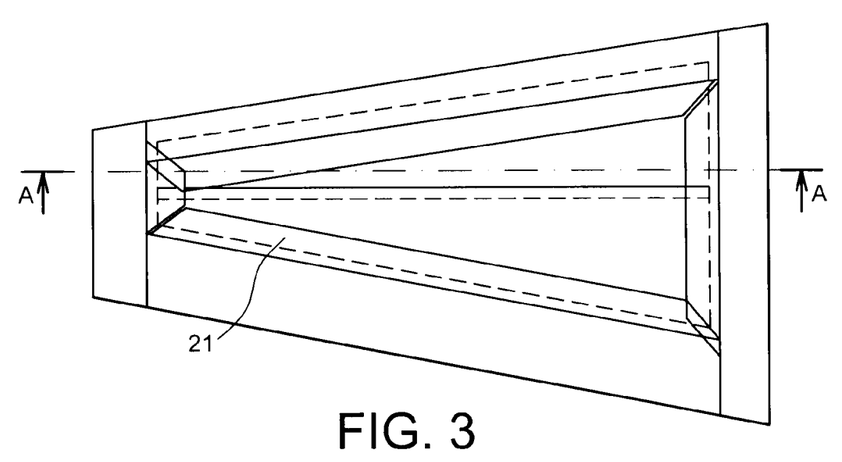
FIGS. 3 and 3A: views from above and in cross-section of a stack 20 of fabrics composed of fibres which is pre-impregnated with a thermoplastic resin, with a smooth film 21, 22 according to the invention, placed in the tool of FIG. 2.
Figure 3A:
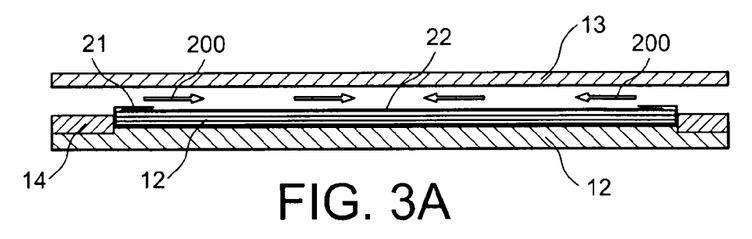
Figure 3B:
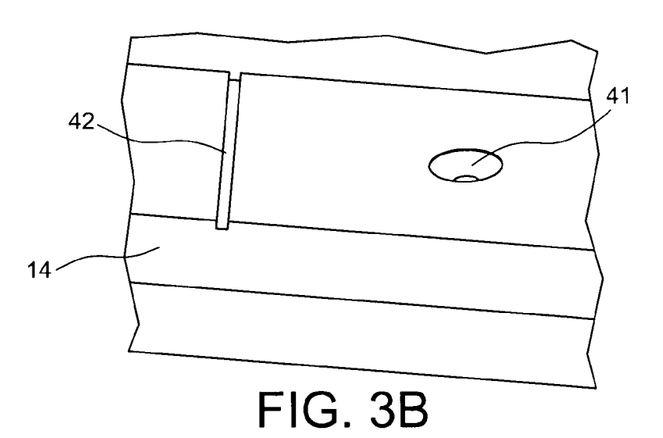
FIG. 3B: a detail view of the fixing blocks (14) used according to the invention.

FIG. 3B shows the way in which they are fixed in the board 12 by means of screws which are housed in the housings 41.

In a conventional manner, the tool 1, the board 12, the fixing blocks 14 and the compacting plate 13 are made for example from tool-grade steel of the type 40CMD8.

FIG. 3A shows one advantageous variant of the positioning of the fixing blocks 14 relative to the board 12: in order to obtain the desired effects, the projection height e between the fixing blocks 14 and the board 12 is preferably proportional to the number of plies of the stack 20. Typically, this height e is expressed, in millimeters, by the formula $0.005 \times N$, where N is the number of plies present in the stack 20. For 20 plies, therefore, the projection height e is at least equal to 0.1 mm.

The entire tool 1 is preferably degreased beforehand using an appropriate solvent.

A portion 21 of film 2, for example a polyimide film, is then arranged on the board 12, after having been cut to the desired shape. This portion 21 is advantageously coated with a demoulding agent, for example of the type FREEKOTE 44NC from the company LOCTITE.

The polyimide films used for carrying out the invention may be produced for example by reacting an aromatic tetracarboxylic dianhydride with an aromatic diamine. The thickness of these films may for example be of the order of 30 μm, and more generally between approximately 20 and 50 μm.

By way of example, use may be made of the following commercially available films:

FILM Thermalimide 50 microns from the company AIRTECH®

FILM Thermalimide 50 microns from the company RICHMOND® (Ref: UHT750).

FILM Thermalimide 50 microns from the company KANEKA® (Ref: 200AV).

In general, because of the small thickness of these polyimide films, the openings or overlap zones of the latter impress only superficial marks onto the surface of the stack after the consolidation thereof, these marks not degrading the surface finish in any way and not significantly weakening the overall mechanical characteristics of the blank obtained.

The polyimide films used, for example of the "thermalimide" type, are chosen to withstand the high temperatures used during the step of consolidating the stack, which may reach 400° C. or more. Since these thermalimide films do not have to be integrated in the final panel resulting from the blank according to the invention, they are therefore provided so as to be easily removed from the upper surface of the compacted stack or from the compacting plate, for example by peeling. In the most frequently encountered case in which the films used adhere neither to the upper surface of the compacted stack nor to the compacting plate at the end of the consolidation step, the removal of these polyimide films obviously does not pose any particular problem.

It is thus possible to see in FIGS. 3 and 3A the first enveloping of the stack of fabrics 20 by the thermalimide film 21 arranged in the tool 1, 12, 13 beforehand and then folded onto these fabrics 20 before installing the sheet 22 in the upper part (facing the plate 13). The upper part of the film 2 may consist of a single sheet 22 but will advantageous be formed with two 22a, 22b (FIG. 4C) or more sheets which overlap over a width d of between 10 mm and 20 mm, preferably equal to 15 mm. The solution using two or more sheets has the advantage of ensuring a better degassing and more possibilities of sliding of the sheets of film one on top of the other.

A stack 20 of pre-impregnated fabrics is cut to the appropriate format and arranged on the film 2 so that the fabrics 20 come into contact, without play, with the fixing blocks 14 around the entire perimeter, that is to say into lateral contact.

The stack of fabrics according to the invention may for example consist of carbon fibre fabrics T300J having a basis weight of 285 g/m$^2$ impregnated with PPS (polyphenylsulphone) resin of the type CD0286. The same method could be carried out with any type of fabric, carbon, glass or aramid or a combination of fabrics, pre-impregnated with any type of thermoplastic resin such as PPS, PEEK or PEI.

Figure 4A:
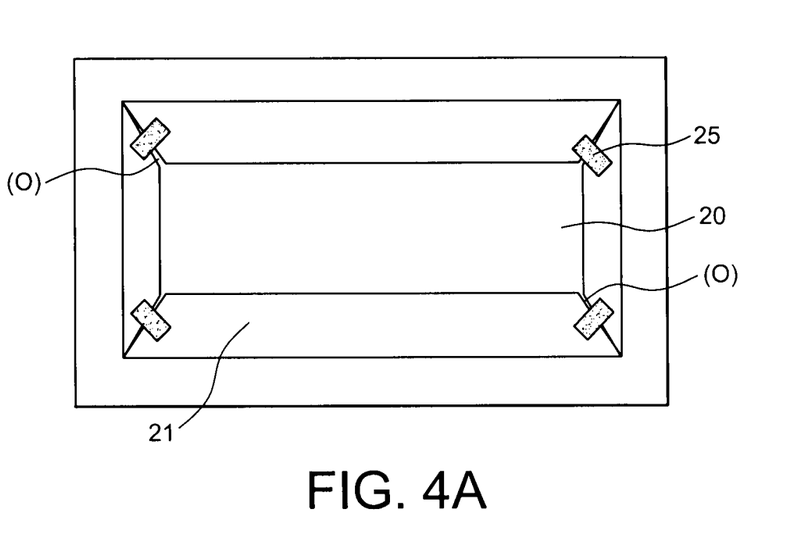
FIGS. 4A and 4B: two views from above showing the steps of enveloping a stack (20) by a film according to the invention for manufacturing a parallelepiped blank.

The edges of the portion 21 of the film 2 are then folded onto the stack 20 and stabilised in this position by the application of high-temperature adhesives 25 according to FIG. 4A.

Figure 4B:
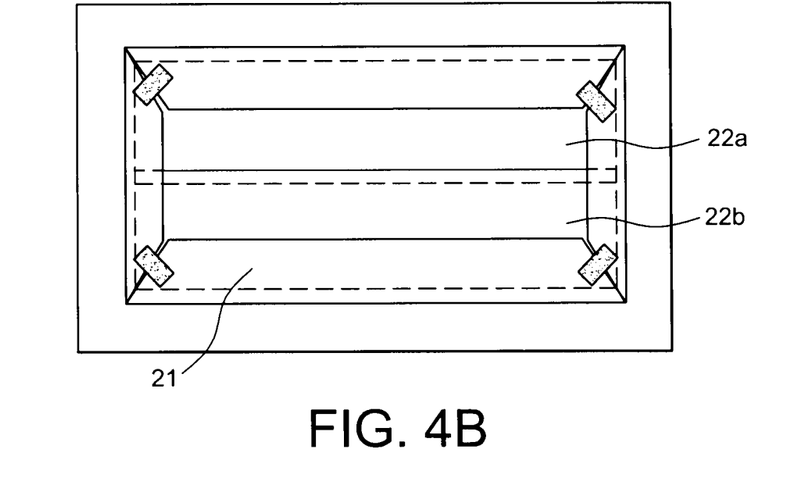
Figure 4C:
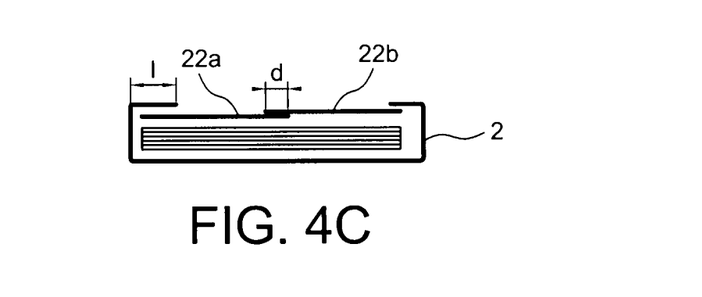
FIG. 4C: shows a cross-sectional view of the stack enveloped according to FIGS. 4A and 4B.

An operator then slides two strips or sheets 22a and 22b previously coated with demoulding agent below the flaps thus formed as shown in FIG. 4B. The overlap 1 between the flaps and the edges of the strips or sheets 22a and 22b is at least 15 mm.

Figure 5:
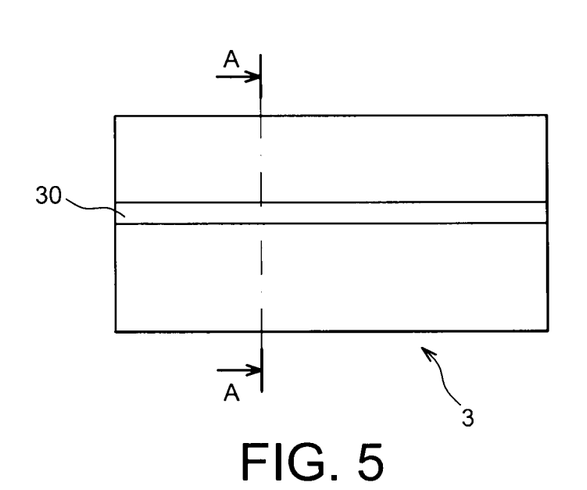
FIGS. 5 and 5A: show views respectively from above and in cross-section along A-A of a blank produced according to the invention.

Once the stack is formed, the film can advantageously be folded onto the edges and preferably fixed by a high-temperature adhesive. One way of fixing at the four corners of the stack is shown in FIG. 5, thus forming four "darts" (one at each corner).

According to one particular embodiment, an operator may then install at least one thermocouple (not shown) in contact with the stack 20 thus enrobed, by passing it through a groove 42 formed in the fixing blocks 14 (FIG. 3B). This thermocouple, in contact with the stack 20, will make it possible to precisely control the pressure/temperature cycle enabling the compacting.

The upper part 11 of the tool 1 supporting the compacting plate 13 is placed on and brought into reference with the lower part 10, the assembly then being transferred below the press (P). Under the effect of the weight of the upper tool 11 first of all and then of the hydraulic pressure initially applied by the press (P), the bulk of the stack 20 is greatly reduced and the compacting plate 13 comes into contact with the fixing blocks 14 with increased force.

During this displacement, a large part of the air and/or gases initially contained in the stack 20 is evacuated, being able to escape from the enrobing through the overlap zones forming an opening (O) between the portions of film.

The non-deformable nature of the film, the particular arrangement at the time of the enveloping and the low coefficient of friction of one portion 21 of the film 2 against the other 22 and also of the film 2 against the stack 20 and against the steel make it possible for the flaps to slide in the direction of the arrows 200 shown in FIG. 3A, that is to say parallel to the plane defined by the upper surface of the stack 20. The stack 20 thus always remains surrounded by the film 2, the latter not folding during this "pre-compacting".

The tool 1 having been placed inside the press (P), it enters into contact with the heating plates 15 and gradually increases in temperature until the melting temperature of the resin is reached (typically 310° C. for a PPS resin). This temperature increase phase is controlled by the thermocouple placed in contact with the stack. Throughout this entire temperature increase phase, a pre-compacting pressure is applied to the stack 20, typically a pressure of 2 bar, the compacting plate 13 remaining in contact with the fixing blocks 14. The joint action of the temperature and of this pressure causes an evacuation of the gases from the stack 20, which can escape first of all from the stack 20 via the openings (O) delimited by the overlaps of the film 2 and then from the tool 1 via the grooves 42 formed in the fixing blocks 14. These grooves 42 thus have the effect of facilitating the evacuation of the gases and of allowing the introduction of control thermocouples. Preferably, the grooves 42 have a width of between 1 and 3 mm for a depth of between 2 and 3 mm.

Once the melting temperature has been reached, the pressure is increased to a higher value, typically 10 bar, the temperature being kept constant. The temperature and pressure are then held at this level for around ten minutes.

The melting of the resin is accompanied by an increase in volume thereof.

Since the height (e) by which the fixing blocks 14 project with respect to the board 12 is less than the final thickness of the compacted stack 20, the latter being itself surrounded by a film 2 of small thickness (for example 0.1 mm=2×50 μm), this pressure is integrally applied to the stack 20 and tends to eject the resin from the stack 20.

However, said resin cannot be expelled from the stack: it "butts" against the fixing blocks 14 so that it can be expelled only in the direction Z. However, the hydrostatic pressure inside "the pocket" created by the enrobing by the (non-deformable) film 2 tends to "close" the overlaps of the film 2, the overlap zone in the centre (d) and at the edges (l) then acting as chicanes and keeping the resin inside the pocket.

Thus, due to the enveloping of the stack 20 by the film 2 with an overlap, the presence of the fixing blocks 14 and the control of the pressure/temperature cycle, a low degree of porosity is ensured by allowing the evacuation of the gases during the pre-compacting phase and then by retaining the resin inside the pocket during the final compacting while applying a high compacting pressure thereto. This compacting pressure may advantageously be at least 1 MPa over the entire stack to be treated.

At the end of this 10-minute holding stage, the assembly is slowly cooled, the rate of cooling being at most 50° C./minute and ideally around 10° C./minute, to a temperature of the order of 170° C. (PPS resin) while maintaining the pressure of 10 bar. The tool 1 is then opened to proceed with the demoulding of the blank thus compacted.

The demoulding temperature is in fact selected in a range of between 50 and 60% of the melting temperature (expressed in degrees Celsius), that is to say at a temperature above the temperature at which the shrinkage phenomenon occurs.

Figure 4D:
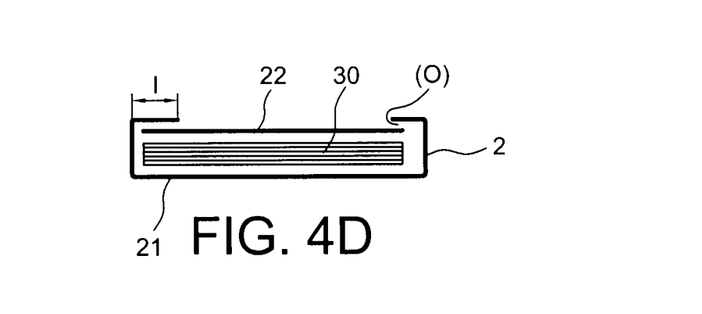
FIGS. 4D to 4F: show cross-sectional views of different ways of enveloping the stack according to the invention, other than that of FIG. 4C.
Figure 4E:
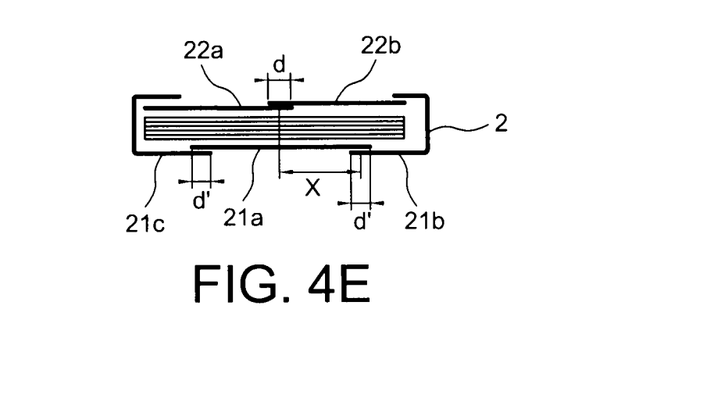
Figure 4F:
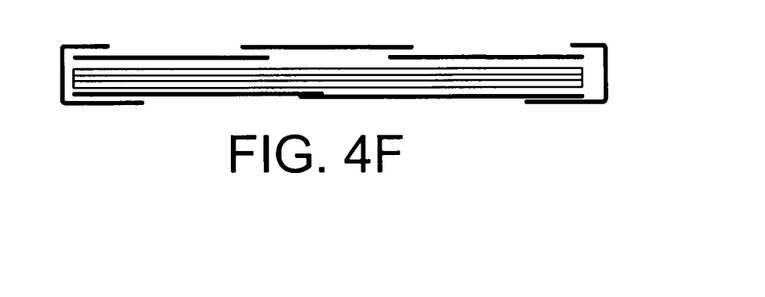

FIGS. 4D to 4F show different examples of multiplying the number of sheets of thermalimide film so as to cover a larger surface area of the stack, while forming overlap zones (O) capable of evacuating the gases. The overlap zones (O) in the upper and lower part must preferably be offset by a distance X. The distance X must be at least equal to 2d, d being the width of the overlap, ideally around 15 mm. In practice, the distance X will most often be equal to the standard width of the sheets of film 2, i.e. 250 mm.

The overlap zones thus created have the aim of not causing zones of mechanical weakness in the blank thus manufactured.

This is because it may happen that the thickness tolerance required for the blank is greater than the thickness of the film 2. For example, the tolerance required for the blank may typically be around 0.01 mm (+/−0.005 mm) whereas the thickness of the film may be around 50 μm. Each overlap zone created according to the invention leaves a mark in the form of a recessed strip having a depth equal to the thickness of the film. Thus, in the overlap mode, it is not possible to allow two recessed strips on either side of the thickness of the blank and opposite one another, since in this way the required thickness tolerance for the blank would not be respected.

Figure 5A:
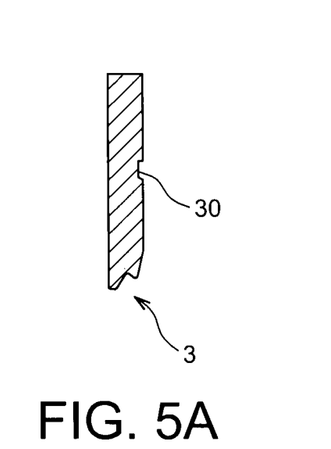

FIGS. 5 and 5A show one example of a mark or imprint 30 left by a film overlap on one of the surfaces of the blank 3 (typically having a depth of around 50 μm).

The proposed method makes it possible to obtain the same results as an autoclave whereas the pressure is ensured by rams of a press and in the absence of a vacuum being applied.

Furthermore, whereas in the prior art the compacting plate is in direct contact with the stack, thus imprinting its own surface finish at the point of contact, the present method uses the interposition of a film between the compacting plate, the base of the tool and the stack so as to obtain a perfect surface finish of the panels, this film being arranged in such a way that it does not hinder the degassing.

In addition, contrary to other methods known from the prior art, the method which forms the subject matter of the invention makes it possible to avoid any creep of the resin, thus ensuring a better strength of the material (absence of the "drying-out" phenomenon).

The invention makes it possible to obtain blanks made from thermoplastic composites with fibre reinforcement in the form of continuous fibres, having geometric characteristics such that:

they can be shaped by hot stamping directly after manufacture without any additional machining operation,
and have material strength and surface quality characteristics which are compatible with aeronautic requirements (Ra<0.8 μm, degree of porosity<1% by volume).

Finally, by virtue of the invention, it is possible to produce blanks with a flat surface, of constant or progressive thickness, which are or are not intended for subsequent stamping and which make it possible to satisfy quality specifications of the "aeronautic" type, i.e.:

a quantity of fibres present in the blank of 60% or more,
a mean flatness tolerance of 1 mm/meter, the overall flatness tolerance depending in practice on the size of the blank to be manufactured,
a parallelism tolerance between the faces or the thickness stages and the flat face of 0.015 mm,
a surface finish having a maximum roughness of Ra<0.8 μm,
a degree of porosity of less than 1% by volume.

It goes without saying that, although in the illustrated embodiments the enveloping of the stack by the film takes place by inserting beforehand a portion of the film onto the board, it may also be carried out separately and in advance, the assembly consisting of the film completely enveloping the stack of fabrics then being placed onto the board.

The invention claimed is:

1. A method of manufacturing a blank made from thermoplastic composite material for a subsequent forming operation, comprising:
   a) enveloping a stack of fabrics composed of continuous fibers pre-impregnated with a thermoplastic resin with a smooth film, leaving at least one opening;
   b) arranging fixing blocks at a periphery of a board and placing the stack of fabrics onto the board so as to bring the enveloping film into contact with the fixing blocks;
   c) placing a compacting plate on top of the stack of fabrics enveloped by the film and placed onto the board; and
   d) applying a pressure and temperature cycle, by pressing on top of the compacting plate and by heating the stack so as to reach at least melting temperature of the thermoplastic resin while leaving the film infusible and smooth, and allowing the gas(es) present in the stack to escape through the opening and then through at least one emerging channel formed in the compacting plate and/or in the board and/or in the fixing blocks,
   wherein the stack is enveloped using a film including at least two parts arranged so that the lower one of the parts is arranged between the stack and the board while being extended along edges of the stack and folded over a zone of the stack, the other, upper one of the parts being slid below the flaps of the lower part.

2. A manufacturing method according to claim 1, in which the flaps of the lower part have a width l of at least 15 mm.

3. A manufacturing method according to claim 1, in which the upper part includes at least two sheets and having an overlap zone with a width d of between 10 and 20 mm.

4. A manufacturing method according to claim 1, in which the lower part includes at least two sheets having an overlap zone with a width d' of between 10 and 20 mm.

5. A manufacturing method according to claim 3, in which the lower part includes at least two sheets having an overlap zone with a width d' of between 10 and 20 mm.

6. A manufacturing method according to claim 5, in which the overlap zone between two lower sheets is offset laterally by a distance X at least equal to 2d relative to the overlap zone between two upper sheets.

7. A manufacturing method according to claim 1, in which a thermocouple is brought into contact with the stack, the temperature information delivered by the thermocouple being used to control the compacting cycle.

8. A manufacturing method according to claim 1, in which a heating cycle is carried out up to the melting temperature of the resin at an initial pressure of at least 2 bar, followed by a holding stage at the melting temperature for at least 10 minutes at a compacting pressure of at least 10 bar, followed by a slow cooling at less than 50° C. per minute at the compacting pressure until a blank demolding temperature of between 50 and 60% of the melting temperature in degrees Celsius is reached.

9. Use of the method according to claim 1 for manufacturing blanks made from composite material used as structural aircraft parts.

* * * * *